(12) United States Patent
Zillmer et al.

(10) Patent No.: US 7,580,779 B2
(45) Date of Patent: Aug. 25, 2009

(54) METHOD FOR OPERATING A HYBRID VEHICLE AND HYBRID VEHICLE

(75) Inventors: Michael Zillmer, Sickte (DE); Ekkehard Pott, Gifhorn (DE); Matthias Holz, Lehre (DE)

(73) Assignee: Volkswagen AG, Wolfsburg (DE)

( * ) Notice: Subject to any disclaimer, the term of this patent is extended or adjusted under 35 U.S.C. 154(b) by 318 days.

(21) Appl. No.: 11/327,129

(22) Filed: Jan. 6, 2006

(65) Prior Publication Data

US 2006/0173590 A1 Aug. 3, 2006

(30) Foreign Application Priority Data

Jan. 7, 2005 (DE) .................. 10 2005 001 047

(51) Int. Cl.
*B60K 6/42* (2007.10)
*F02D 17/00* (2006.01)

(52) U.S. Cl. ......................... 701/22; 180/65.2
(58) Field of Classification Search ............... None
See application file for complete search history.

(56) References Cited

U.S. PATENT DOCUMENTS

| | | | |
|---|---|---|---|
| 4,010,717 A | 3/1977 | Taplin | 123/32 EH |
| 4,408,496 A | 10/1983 | Dahle et al. | 73/728 |
| 4,524,624 A | 6/1985 | Di Noia et al. | 73/708 |
| 4,541,288 A | 9/1985 | Kornrumpf et al. | 73/862.69 |
| 4,561,314 A | 12/1985 | Alley et al. | 73/862.69 |
| 4,621,503 A | 11/1986 | Woods et al. | 62/228.3 |
| 5,007,295 A | 4/1991 | Gustafsson et al. | 73/862.69 |
| 5,337,720 A | 8/1994 | Murakami et al. | 123/481 |
| 5,619,956 A * | 4/1997 | Koziara et al. | 123/41.31 |
| 5,803,040 A | 9/1998 | Biesinger et al. | 123/198 |
| 6,085,723 A * | 7/2000 | Pels et al. | 123/339.22 |
| 6,487,998 B1 * | 12/2002 | Masberg et al. | 123/192.1 |
| 6,561,036 B1 | 5/2003 | Gustafsson et al. | 73/714 |
| 6,748,916 B2 | 6/2004 | Schaefer-Siebert | 123/198 |
| 7,025,033 B2 | 4/2006 | Foelsche | 123/198 |
| 7,040,433 B2 * | 5/2006 | Yamamoto et al. | 180/65.2 |
| 7,225,782 B2 * | 6/2007 | Pallett et al. | 123/192.1 |
| 7,344,129 B2 * | 3/2008 | Nemoto | 267/140.14 |
| 2003/0034002 A1 * | 2/2003 | Armstrong et al. | 123/192.1 |
| 2003/0145808 A1 | 8/2003 | Foelsche | 123/44 |
| 2003/0160118 A1 | 8/2003 | Schmauser | 239/585.1 |
| 2003/0160455 A1 | 8/2003 | Hu et al. | 290/40 |
| 2004/0009351 A1 | 1/2004 | Venigalla et al. | 428/386 |
| 2004/0012206 A1 * | 1/2004 | Wakashiro et al. | 290/40 C |
| 2005/0205049 A1 | 9/2005 | Lewis | 123/198 |

FOREIGN PATENT DOCUMENTS

DE 33 16 446 A1 11/1983

(Continued)

*Primary Examiner*—Michael J. Zanelli
(74) *Attorney, Agent, or Firm*—King & Spalding L.L.P.

(57) ABSTRACT

In a method for operating a hybrid vehicle with an electric motor coupled with a multi-cylinder internal combustion engine having at least one cylinder that can be switched off, with a first partial momentum, from an overall momentum provided to the vehicle, being provided by the internal combustion engine and a second partial momentum from the electric motor, and the second partial momentum is used specifically for dampening a cyclic irregularity of the internal combustion engine. Further, means are provided in a hybrid vehicle control, by which the second partial momentum can be used specifically to dampen the cyclic irregularity of the internal combustion engine when one or, if necessary, several cylinders are switched off.

19 Claims, 2 Drawing Sheets

FOREIGN PATENT DOCUMENTS

| | | |
|---|---|---|
| DE | 42 92 543 C1 | 2/1997 |
| DE | 195 46 549 C1 | 3/1997 |
| DE | 100 06 743 A1 | 10/2000 |
| DE | 102 04 129 A1 | 8/2003 |
| EP | 0589517 | 9/1993 |
| EP | 1 298 300 A2 | 4/2003 |
| GB | 2 119 853 A | 5/1983 |
| JP | 2001-57709 * | 2/2001 |
| JP | 2004-52573 * | 2/2004 |
| WO | WO 2005/105500 A1 * | 11/2005 |

* cited by examiner

VM: Combustion Motor    EM: E-machine

METHOD FOR OPERATING A HYBRID VEHICLE AND HYBRID VEHICLE

PRIORITY

This application claims priority from German Patent Application No. DE 10 2005 001 047.4, which was filed on Jan. 7, 2005, and is incorporated herein by reference in its entirety.

TECHNICAL FIELD

The invention relates to a method for operating a hybrid vehicle and a hybrid vehicle.

BACKGROUND

For hybrid vehicles two or more drive units are combined with one another, which in different manners provide the power required for operating the vehicle. Due to the fact that the features of an internal combustion engine and an electric motor complement one another in a particularly beneficial manner, presently common hybrid vehicles are mostly provided with a combination of an internal combustion engine and an electric motor. The operation of the vehicle occurs via the electric motor primarily in the range of small loads, because the internal combustion motors provide considerably lower levels of effectiveness under partial load than under full load. Under higher loads the operation occurs preferably via the internal combustion engine, because then the electric energy accumulator, from which the electric motor is supplied during operation, can be recharged with relatively good effectiveness by an additional generating operation of the electric motor. In order to increase the maximum torque provided for the vehicle, additionally the release of momentum from the internal combustion engine and the electric motor can also occur parallel.

In multi-cylinder internal combustion engines, a higher overall effectiveness can be achieved by switching off some cylinders, because the remaining cylinders can be operated with higher effectiveness. A hybrid drive with a thermal engine is known from DE 100 06 743 A1, for example, which is provided with the possibility to switch off cylinders in order to avoid any operation under partial load.

When some cylinders are switched off, an internal combustion engine usually operates with a higher level of cyclic irregularities than when all cylinders operate, because the ignition intervals are lengthened. An increase of the level of cyclic irregularity can result in loss of comfort and an increased wear of motor and drive components.

Switching off cylinders is preferably used in motors with high numbers of cylinders, for example, 8 or 12 cylinder motors, switching off N/2-cylinders. Here, in motors with high numbers of cylinders a sufficiently high number of cylinders can still be ignited with constant ignition intervals, even when half of the cylinders are switched off, so that an acceptable engine smoothness with respect to comfort can still be achieved. However, in motors with few cylinders only a loss of comfort has to be expected when some cylinders are switched off.

In addition to concepts, in which only the fuel supply to the cylinders switched off is interrupted or the fresh air or air mixture supply is interrupted via throttles, it is known to perform the switching off via a control of the inlet and outlet valves. For example, from DE 102 04 129 a hybrid vehicle is known, in which, for the purpose of a low vibration when the internal combustion engine is switched off, additionally condensing means are released, in particular in a piston. The release of the condensing means can be achieved by opening a throttle, shortening a compression phase, shortening the time, at which both the inlet and the outlet valves are simultaneously closed, a permanent opening of the inlet and outlet valves or the like. Additionally, one or more cylinders of the internal combustion engine can be switched off mechanically. This can be achieved such that a cylinder control addresses the inlet and outlet valve, either directly or indirectly or via a control for the camshaft such, that the outlet and the inlet valve of the combustion chamber are permanently opened or closed when the internal combustion engine is switched off.

SUMMARY

The object of the present invention is to provide a method for operating a hybrid vehicle, by which cyclic irregularities of the internal combustion motor can be avoided when one or more cylinders are switched off. Another object is to provide a respective hybrid vehicle with reduced cyclic irregularity when one or more cylinders are switched off.

According to the invention, the objects can be attained by a method for operating a hybrid vehicle with an electric motor coupled to a multi-cylinder internal combustion engine, having at least one cylinder that can be switched off, with a first partial momentum, of a total momentum provided to the vehicle, being provided by the internal combustion engine and a second partial momentum by the electric motor, the method comprising the step of using the second partial momentum is specifically for dampening cyclic irregularities of the internal combustion engine, when one or several cylinders are switched off.

A measurement of the cyclic irregularity can be determined for the dampening of the cyclic irregularity and depending on the measurement a dampening counter momentum is applied onto the internal combustion engine via the electric motor, which preferably is operated alternating by motor and by generator. For the dampening of the cyclic irregularity the partial momentum provided by the internal combustion engine can be selected depending on the drag momentum of the internal combustion engine. For the dampening of the cyclic irregularity the partial momentum provided by the internal combustion engine can be selected in a range from more than 80% and/or less than 300% of the drag momentum of the internal combustion engine. An even number n of cylinders that can be switched off can be provided and n/2 cylinders each can be jointly switched on and/or off. At least two cylinders that can be switched off can be provided and the cylinders are alternating switching on and off according to predetermined time or cycle patterns. The dimension and/or phase of the dampening can be selected depending on operational parameters, preferably from a fuel consumption parameter and a driving comfort parameter of the vehicle. A fuel injected gasoline or diesel motor can be used as the internal combustion engine. Switching off the cylinder or cylinders may occur by deactivating gas exchange valves and/or stroke reversing of cams of the camshaft. Electric motor and multi-cylinder internal combustions engines can be coupled to one another in a mechanically fixed manner. Electric motors and multi-cylinder internal combustion engines can also be variably coupled to one another in a mechanical manner.

The objects can also be achieved by a hybrid vehicle comprising an electric motor coupled to a multi-cylinder internal combustion engine, having at least one cylinder that can be switched off, wherein a first partial momentum, from the entire momentum provided to the vehicle, being provided by the internal combustion engine and a second partial momentum by the electric motor, and control means, operable to control the second partial momentum such that it can be used specifically for dampening a cyclic irregularity of the internal combustion engine when one or several cylinders are switched off.

The internal combustion engine can be a directly fuel-injected gasoline or diesel motor. The electric motor and the multi-cylinder engine can be mechanically coupled to one anther mechanically. The electric motor and the multi-cylinder internal combustion engine can also be variably coupled to one another mechanically.

In the method of the type according to the invention, in which a first partial momentum, from the total momentum provided by a vehicle, is provided the internal combustion engine and a second partial moment by the electric motor such, that when two or, if necessary, several cylinders are switched off, the second partial moment is used specifically for dampening or reducing a cyclic irregularity of the internal combustion engine. Using the method according to the invention, an increase in cyclic irregularity of the internal combustion engine, occurring when some cylinders are switched off, can be avoided partially or entirely so that an improvement in comfort and a reduction of wear effects in the motor and the drive system in reference to prior art can be avoided.

In a further embodiment of the method, a measure of the cyclic irregularity is determined and, depending on said measure for dampening or reducing the cyclic irregularity, the electric engine is operated, preferably alternating via motor or generator, in order to apply the dampening counter momentum onto the internal combustion engine, which achieves a reduction of the cyclic irregularity as necessary.

In a further embodiment of the invention, at a predetermined number of cylinders switched off, in order to dampen or reduce the cyclic irregularities, the partial momentum provided by the internal combustion engine is selected depending on the drag momentum of the internal combustion engine. Preferably, the partial momentum provided by the internal combustion engine ranges from more than 80% and/or to less than 300% of the drag momentum. The remaining momentum required for the drive is provided by the electric motor. In this operational mode, only relatively small cyclic irregularities of the internal combustion engine occur so that a low dampening counter momentum of the electric motor onto the internal combustion engine needs to be applied or none at all.

Preferably, the internal combustion engine is provided with an even number of cylinders that can be switched off, with N/2-cylinders each being switched on and/or off jointly, in order to ensure any cyclic irregularities to be as low as possible when cylinders are switched off.

In a further embodiment of the invention it is provided for the internal combustion engine to have at least two cylinders that can be switched off, and an alternating on and off switching of said cylinders occurs according to the predetermined time and cycle patterns, in order to avoid unilateral stress on certain cylinders of the internal combustion engine.

In a further embodiment of the invention the intensity and/or phase of the dampening is selected depending on the operational parameters, preferably via a fuel consumption and drive-comfort parameters of the vehicle, and thus it is considered that the dampening of the cyclic irregularity is accompanied by energy consumption.

The electric motor and the multi-cylinder internal combustion engine are permanently coupled to one another in a preferred embodiment of the invention, which omits the expense required for a variable connection via a transmission and/or a clutch between the electric motor and the multi-piston internal combustion engine.

The method according to the invention is used particularly advantageously in a gasoline engine or a diesel engine with fuel injection. It is advantageous, when a particularly exact adjustment of the fuel mass is possible for the individual cylinders, which allows a more precise adjustment of the momentum provided by the individual cylinders, which again is important for a better driving comfort level in a lower number of ignited cylinders.

The switching off of said cylinder or cylinders occurs beneficially by way of activating the gas exchange valves and/or a lift conversion of cams on the camshaft, although other means of switching off cylinders are included in the invention.

In the hybrid vehicle according to the invention control means are provided, which allow that the second partial momentum can be used, when one or more cylinders are switched off, for dampening the cyclic irregularity of the internal combustion engine.

BRIEF DESCRIPTION OF THE DRAWINGS

Further advantages and aspects of the invention are shown in the claims using the drawing, independent from their abstract, in the following description of the exemplary embodiments.

It shows.

DETAILED DESCRIPTION

Figure 1:
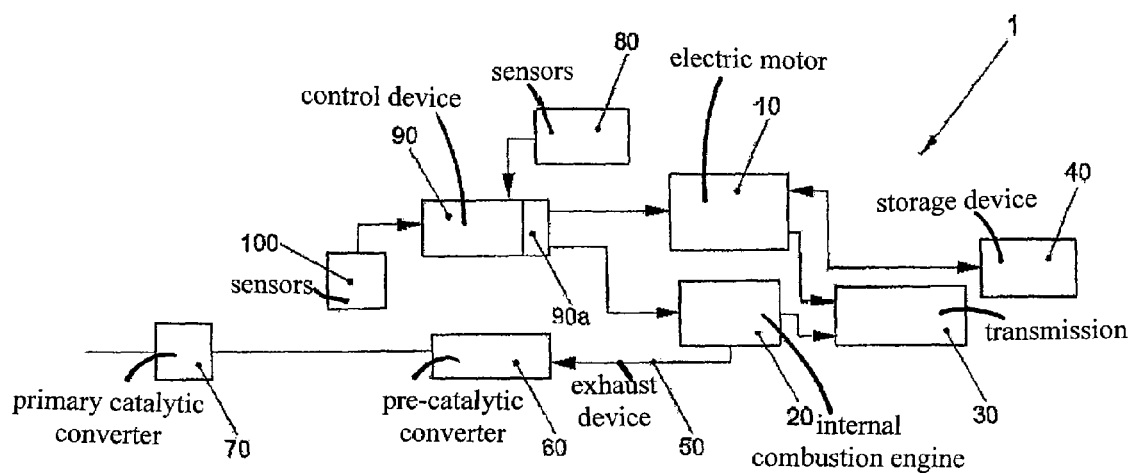
FIG. 1 a hybrid drive for a hybrid vehicle according to the invention

FIG. 1 shows in a schematic representation a hybrid drive 1 for an otherwise not shown vehicle. An electric motor and/or an electric engine 10 and a multi-cylinder combustion engine 20 is coupled with a transmission 30, which is fixed or variably connected to at least one vehicle wheel, not shown in FIG. 1. For connecting the electric motor to the motor camshaft, various concepts are possible. Here, preferred concepts are a connection via a clutch, a direct connection to the motor camshaft, or a connection via a belt drive or a transmission. In another embodiment of the invention, the electric engine 10 and the multi-cylinder combustion engine 20 are mechanically coupled in a fixed manner. An arrangement of the electric motor 10 between a camshaft exit of the internal combustion engine 20 and a transmission entry is preferred. The electric motor 10 is electrically coupled with an electric energy storage device, for example a rechargeable battery or the like. An exhaust arrangement 50 with a pre-catalytic converter 60, in close proximity to the motor, and a down-stream arranged primary catalytic converter 70 is allocated to the internal combustion engine 20. A motor control device 90 receives control signals via control sensors 80, for example the drive pedal module or an antilock breaking system, as well as values of operational parameters of the hybrid vehicle, in particular of the electric motor 10, the internal combustion engine 20, the exhaust device 50 and other vehicle components via sensors 100.

In a particularly preferred embodiment of the invention the internal combustion engine 20 represents a gasoline engine with fuel injection. Particularly preferred is a gasoline engine with fuel injection that can run with a lean fuel mixture, because here, in lower load rotation values considerable fuel savings can be achieved in reference to conventional gasoline engines. In particular, in these embodiments of the invention it is useful to embody the catalytic converter systems such that the pre-catalytic converter 60 is a 3-way catalytic converter and the primary catalytic converter 70 is a NOx-storage catalytic converter. The pre-catalytic converter 60 preferably serves to clean stochiometric exhaust, to convert hydrocarbons (HC) in lean exhaust, and to improve the exhaust cleaning during cold starts. The NOx-storage catalytic converter 70 is preferably embodied for the storage of nitrous oxides (NOx) in lean exhaust. Depending on the charge with NOx and, if necessary, additional secondary conditions, regeneration of the NOx-storage capacity is required with exhaust ranging from stochiometric to rich.

In a preferred embodiment, the control device 90 includes one or more micro processors, data memories, and interfaces as well as control devices 90a, by which depending on the signals of the sensors 80, the overall torque and/or partial torques are determined, which are provided by the electric motor 10 and the internal combustion engine 20 and which are provided at least partially for the transmission 30. The coupling between the electric motor 10 and the internal combustion engine 20 allows both a negative as well as a positive torque transmission between these two components.

The sensors 100, not shown in greater detail in FIG. 1, include sensors for measuring or determining operational parameters, preferably of the storage device 40, the electric motor 10, the internal combustion engine 20, and the exhaust device 50. In particular, lambda sensors can be arranged in the exhaust device 50, upstream of the pre-catalytic converter 60, downstream of the pre-catalytic converter 60, upstream of the primary catalytic converter 70, or downstream of the primary catalytic converter 70. Further, at various positions of the exhaust device, sensors for NOx, SOx, or hydrocarbons can be arranged. In order to measure the temperature of the exhaust or the catalytic converter system temperature sensors can be provided at various sites, internally mounted.

The internal combustion engine 20 allows for cylinders to be switched off. According to the invention, the total torque provided to the vehicle is provided in form of a first partial momentum by the internal combustion engine and a second partial momentum by the electric motor and, when one or, if necessary, several cylinders are switched off, the second partial momentum is used specifically for dampening a cycle irregularity of the internal combustion engine.

According to the invention, the possibility of activating a cylinder is used in order to increase the effectiveness of a combined operation of the vehicle by the internal combustion engine and the electric motor. The particularly lower running smoothness resulting from motors with few cylinders, which can lead to a loss in comfort, is compensated according to the invention by using a partial momentum provided by the electric motor for dampening the cyclic irregularity of the internal combustion engine.

The method according to the invention is particularly advantageous in a gasoline engine or a diesel engine with fuel injection. Here, a particularly precise adjustment of the fuel mass is possible for the individual cylinders and, thus, an exact release of the momentum. In a gasoline motor with direct fuel injection, practically no film forms at the wall of the manifold passage, which occurs in motors with intake manifolds. In the latter, an alternating ignited/unignited operation of the cylinder results in increased exhaust of burnt hydrocarbon content in the exhaust system, which could result in reduced exhaust quality and life of the catalytic converter system.

Preferably, the internal combustion engine 20 is provided with a variable valve operation, which can be embodied as a mechanical or electrical system, partially or entirely variable. A cylinder shut-off is preferred, in which the individual inlet valves or preferably the inlet valve and the outlet valves of the individual cylinders can be deactivated to zero by a stroke change-over of the cams of the motor camshaft. In such a cylinder shut-off the injection device is also deactivated for the respective cylinders. In a spark ignitioned motor, preferably the ignition device of the respective cylinder is also deactivated. In an integral number of cylinders N, preferably the switch-off is performed in N/2 cylinders.

Figure 2:
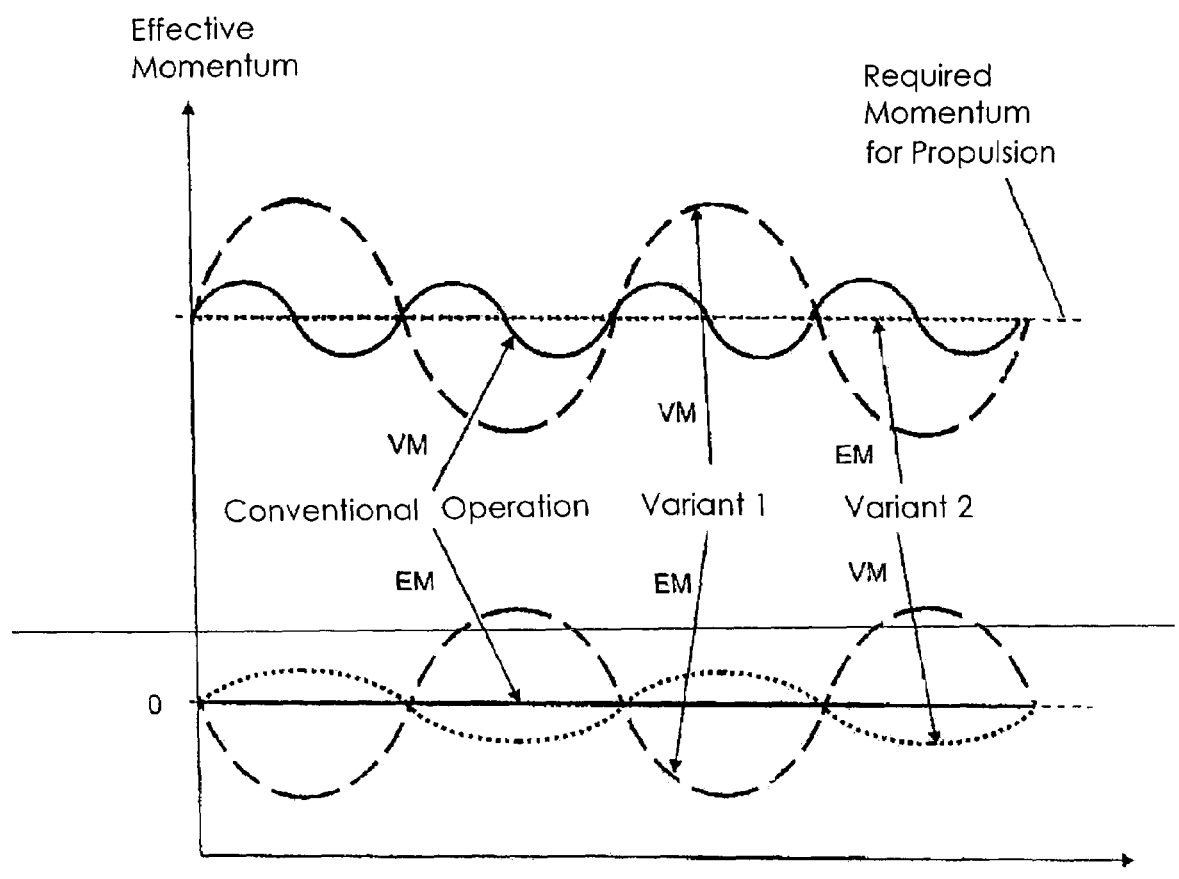
FIG. 2 a temporal progression of motor momentums for a conventional operation and for one of a hybrid vehicle according to the invention.

In FIG. 2, for illustrating the method, a temporal progression of the motor momentum is shown in a conventional operation using two preferred embodiments of the invention. For the forward drive of the vehicle a predetermined momentum MV is required. The momentum provided by the internal combustion engine is named VM, the momentum provided by the electric motor with EM. In a conventional operation without an electric motor and without cylinders being switched-off, cyclic irregularities of the internal combustion engine occur, which have a small amplitude and relatively high frequencies with a relatively high number of cylinders and short ignition intervals. When one or several cylinders are switched-off, generally the ignition intervals become longer, thus resulting in the cyclic irregularities of the internal combustion engines. Therefore the momentum VM has a value dynamically deviating considerably from the predetermined momentum MV.

It is required for the variant 1 that the internal combustion engine and the electric motor are mechanically coupled during the dampening. In the embodiment named variant 1 the electric motor is operated alternating by the motor or the generator and here a dampening counter momentum is specifically acting upon the internal combustion engine. Generally, the counter momentum has a slightly lower amplitude than the cyclic irregularity.

For an optimum dampening effect it is also possible to provide the counter momentum of the electric motor with an phase offset in reference to the cyclic irregularity.

When performing the method, preferably a measure for the cyclic irregularity is determined and the dampening counter momentum onto the internal combustion engine is applied depending on said measure by way of the electric motor. For example, a temporal progression of the cyclic irregularity is determined. The electric motor is operated depending on said progression. Usually the electric motor is operated alternating by the motor and the generator for applying the counter momentum.

Preferably, the determination of the cyclic irregularity occurs via a determination of the torque of the internal combustion engine using one or, if necessary, more torque sensors.

In an embodiment of the method named variant 2 in FIG. 2 the partial momentum provided for dampening the cyclic irregularity of the internal combustion engine is selected depending on the drag momentum of the internal combustion engine in a given number of cylinders switched-off. The partial momentum provided by the internal combustion engine preferably ranges from more than 80% and/or less than 100%, 200%, or 300% of the drag momentum of the internal combustion engine. The difference to the momentum MV required for the forward drive is provided by the electric motor. The momentum VM released by the internal combustion engine essentially or largely serves to compensate the internal drag momentum. In this mode of operation, cyclic irregularities occur with smaller amplitudes so that even without any mechanical coupling to the electric motor a comfortable drive is possible. It is understood that even in a mechanical coupling of the internal combustion engine to the electric motor this embodiment of the method can be used.

In another embodiment of the method, not shown in FIG. 2, variants 1 and 2 are combined with one another. In this combination the torque necessary for the forward drive of the vehicle is provided by the electric motor and additionally a counter momentum is applied onto the internal combustion engine for dampening.

Preferably, it is provided that cylinders are alternatingly switched on and off according to predetermined time and cycle patterns. Here, the ignited and the un-ignited operations between the individual cylinders alternate in predetermined temporal intervals and/or according to a predetermined number of combustion cycles. At an even number of cylinders it is here advantageous for the ignition intervals to be constant.

Depending on the type of the internal combustion engine and the modes of operation available, switching on the cylinders that were switched off can occur in different modes of operation. The time of the activation of the fuel injection and the injection into the respective cylinder is variably selected depending on the mode of operation when the cylinder is switched on. Fuel injection into said cylinders is preferably ended when a homogenous mode of operation is activated upon the end of the suction phase. In a homogenous-spit mode of operation only the first part of the injection is finished by the end of the suction phase. Using this selection of the injection time, sufficient time can be provided for a homogenization of the mixture. If the previously switched-off cylinder is operated in a mode of stratified charge, the fuel injection is preferably performed during the compression phase in order ensure a desired charge layering in the combustion chamber of the cylinder. If necessary, the activation of the ignition device occurs at a suitable time during the suction and/or compression phase.

Further, in order to adjust the momentum during activation of a cylinder switched-off a specific selection of a mode of operation and/or an ignition angle setting occurs for one or more combustion cycles of at least one cylinder.

For example, a fuel injected gasoline motor is operated with only little rotation and load requirements in a layered or homogenous lean operation. When cylinders are switched-off under high dethrottling of the internal combustion engine the exhaust flow is reduced and the exhaust temperature is increased, and therefore higher temperatures in the catalytic converter and increased conversion rates of the catalytic converters can be achieved during low load operation. In particular, when NOx-charge capacitors are used in a lower partial load operation the chargeable NOx-mass can be increased with an identical conversion rate. This allows a longer lean operation between regeneration processes and another reduction of the fuel consumption.

LIST OF NUMERALS 1 hybrid drive with control system
10 electric motor
20 internal combustion engine
30 transmission
40 battery
50 exhaust system
60 pre-catalytic converter
70 primary catalytic converter
80 sensors
90 motor control device
90a device for controlling the torque release
100 sensors

What is claimed is:

1. A method for operating a hybrid vehicle having a multi-cylinder internal combustion engine which is coupled to an electric machine, the internal combustion engine having at least one cylinder which can be switched off, wherein of a total momentum provided by the vehicle a first partial momentum is provided by the internal combustion engine and a second partial momentum is provided by the electric machine, the method comprising the step of:
    when one or several cylinders is/are switched off, utilizing the second partial momentum in a controlled manner to damp cyclic irregularities of the internal combustion engine, wherein at least one of a magnitude and phase of the damping is determined on the basis of fuel consumption and a vehicle driving comfort parameter.

2. A method according to claim 1, wherein a measurement of the cyclic irregularity is determined for said dampening of the cyclic irregularity and depending on said measurement a dampening counter momentum is applied onto the internal combustion engine via the electric machine.

3. A method according to claim 1, wherein a measurement of the cyclic irregularity is determined for said dampening of the cyclic irregularity and depending on said measurement a dampening counter momentum is applied onto the internal combustion engine via the electric machine, wherein for generating said dampening counter momentum the electric machine is operated either in a motor-mode or in a generator-mode.

4. A method according to claim 1, wherein for said dampening of the cyclic irregularity the partial momentum provided by the internal combustion engine is selected depending on a drag momentum of the internal combustion engine.

5. A method according to claim 4, wherein for said dampening of the cyclic irregularity the partial momentum provided by the internal combustion engine is selected in a range from more than 80% and less than 300% of the drag momentum of the internal combustion engine.

6. A method according to claim 5, wherein an even number n of cylinders that can be switched off is provided and n/2 cylinders each are jointly switched on and/or off.

7. A method according to claim 1, wherein at least two cylinders that can be switched off are provided and said cylinders are alternating switching on and off according to predetermined time or cycle patterns.

8. A method according to claim 1, wherein at least one of a dimension and a phase of the dampening is selected depending on operational parameters.

9. A method according to claim 1, wherein a fuel injected gasoline or diesel motor is used as the internal combustion engine.

10. A method according to claim 1, wherein switching off said cylinder or cylinders occurs by at least one of deactivating gas exchange valves and stroke reversing of cams of the camshaft.

11. A method according to claim 1, wherein the electric machine and the multi-cylinder internal combustion engine are coupled to one another in a mechanically fixed manner.

12. A method according to claim 1, wherein the electric machine and the multi-cylinder internal combustion engine are variably coupled to one another in a mechanical manner.

13. A hybrid vehicle comprising:
    an electric motor coupled to a multi-cylinder internal combustion engine, having at least one cylinder that can be switched off, wherein a first partial momentum, from the entire momentum provided to the vehicle, being provided by the internal combustion engine and a second partial momentum by the electric motor, and control means, operable to control the second partial momentum such that when one or several cylinders is/are switched off, the second partial momentum is used in a controlled manner to damp cyclic irregularities of the internal combustion engine, wherein the control means are further operable to determine at least one of a magnitude and phase of the damping on the basis of fuel consumption and a vehicle driving comfort parameter.

14. A hybrid vehicle according to claim 13, wherein the internal combustion engine is a directly fuel-injected gasoline or diesel motor.

15. A hybrid vehicle according to claim 13, wherein the electric motor and the multi-cylinder engine are mechanically coupled to one another.

16. A hybrid vehicle according to claim 13, wherein the electric motor and the multi-cylinder internal combustion engine are variably coupled to one another mechanically.

17. A method for operating a hybrid vehicle with an electric motor coupled to a multi-cylinder internal combustion engine, having at least one cylinder that can be switched off, with a first partial momentum, of a total momentum provided to the vehicle, being provided by the internal combustion engine and a second partial momentum by the electric motor, the method comprising the steps of:

dampening cyclic irregularities of the internal combustion engine using the electric motor when one or several cylinders are switched off, wherein a measurement of the cyclic irregularity is determined for said dampening of the cyclic irregularity and depending on said measurement a dampening counter momentum is applied onto the internal combustion engine via the electric motor; and wherein at least one of a magnitude and phase of the damping is determined on the basis of fuel consumption and a vehicle driving comfort parameter.

18. A method according to claim 17, wherein for said dampening of the cyclic irregularity the partial momentum provided by the internal combustion engine is selected in a range from more than 80% and less than 300% of the drag momentum of the internal combustion engine.

19. A method according to claim 18, wherein an even number n of cylinders that can be switched off is provided and n/2 cylinders each are jointly switched on and/or off.

* * * * *